March 19, 1963  H. I. MEISNER  3,081,575

OUTRIGGER LINE RELEASE

Filed April 3, 1962

INVENTOR.
HERBERT I. MEISNER
BY
ATTORNEY

United States Patent Office 3,081,575
Patented Mar. 19, 1963

3,081,575
OUTRIGGER LINE RELEASE
Herbert I. Meisner, 60 W. 22nd St., Hialeah, Fla.
Filed Apr. 3, 1962, Ser. No. 184,720
1 Claim. (Cl. 43—43.12)

This invention relates to fishing line holders and release devices and has particular reference to a device of the kind used by a fisherman when trolling or drifting, and which is suspended from an outrigger on the fishing vessel and holds the line from possible entanglement and frees it when a fish strikes the bait.

It is an object of the invention to provide a device of this character which will effectively hold the line during trolling or drifting and which will release it upon a strike being made; which will serve to prevent tangling of the line and the possibility of it being fouled in the outrigger; which can be readily adjusted to enable it to apply the required tension on a fishing line engaged by it, and which will protect the line against damage and fraying.

More particularly, the invention contemplates the provision of a line holder and release device which consists of a pair of cup-shaped hollow cylindrical shells arranged in end-to-end contact and so maintained by spring means tending to clamp the shells together. A fishing line is inserted between the shells, and the spring means is adjustable to thereby vary the tension imposed by the shells on different types and sizes of fishing lines. When the bait on the line is taken by a fish and a pull is thus exerted on the line, the line will be withdrawn from between the shells, which will then snap together audibly, thus indicating the withdrawal of the line and permitting the fisherman to then play or reel in the caught fish. The invention also contemplates the provision of suspension means by which the device can be suspended from an outrigger, and to other features as will be apparent from the description to follow.

With these and other objects to be hereinafter set forth in view, I have devised the arrangement of parts to be described and more particularly pointed out in the claim appended hereto.

In the accompanying drawing, wherein an illustrative embodiment of the invention is shown, FIG. 1 is an elevational view of an outrigger line holder and release device shown connected to an outrigger in position of use;

The improved line holder and release device consists primarily of a pair of cup-shaped, cylindrical hollow members or shells resiliently and adjustably maintained in abutting relation to firmly, yet releasably hold a fishing line between them until a pull exerted on the line by a fish striking the bait in the water, causes the line to be freed from the device to permit the reeling-in of the fish.

The two cup-shaped members or shells indicated respectively at 1 and 2, are alike in shape and construction. They may be composed of a suitable tough plastic material and each is in the form of a hollow cylindrical cup having a peripheral side wall and an end wall, the side will being indicated at 3 and the integral end wall at 4. The side wall smoothly merges with the end wall with the curvature indicated at 4a to thereby facilitate the entry of a fishing line between the end walls 4 in a manner to be explained. Centrally located on the end wall 4 is a boss 5 directed inwardly into the cup and located inside of the same. Each boss 5 is formed with an axial square or non-round opening 6 increased in size in the form of a round opening at one end, as shown at 7.

Figure 2:
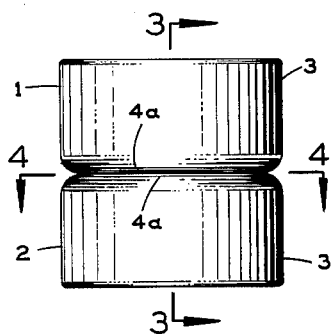
FIG. 2 is an elevational view of the line holder and release device.
Figure 3:
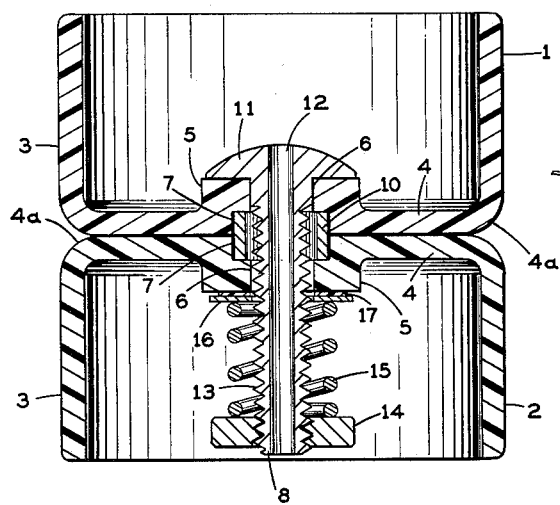
FIG. 3 is an enlarged sectional view, taken substantially on the line 3—3 of FIG. 2, looking in the direction of the arrows.

In their operative positions, the two cups 1 and 2 are placed together in end-to-end relation, with their end walls 4 in abutment, substantially as shown in FIGS. 2 and 3. A tubular bolt 8 is extended through the then aligned axial openings 6 and 7, and the co-operating openings 7 form a chamber which receives a metallic sleeve or bushing 10 that encircles the shank of the bolt 8. At one end, the shank of the bolt is formed with a rounded head 11 and an axial passage 12 is provided through the bolt.

The shank of the bolt 8 is screw-threaded as shown at 13 for the reception of a knurled adjusting nut 14. A coil spring 15 surrounds the threaded shank 13, the spring being confined between the nut 14 and washers 16 and 17, the washers being urged against one of the bosses 5 by the spring. The washer 16 is preferably composed of metal, while that shown at 17 may be of a non-metallic material such as Teflon or a material of similar characteristics. This arrangement is such that the two cups or shells are clampingly maintained together under regulatable pressure controlled by the adjustment of the nut 14.

To maintain the bolt 8 from rotative movement relatively to the cups or shells 1 and 2, the bolt is provided behind its head 11, with a square portion 20 fitting within the square opening 6 in one of the cups or shells.

Figure 1:
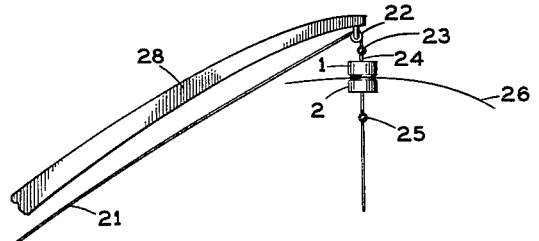

From the foregoing, the operation of the improved line holder and release will be readily understood. In FIG. 1 is disclosed one way in which the same is used, wherein 28 indicates a conventional outrigger as employed on a fishing vessel or other boat used for fishing. An endless suspension line or cord is shown at 21, the same extending through a guide 22 and attached through a swivel connection 23 to a short length of line 24 passing through the axial passage 12 of the bolt 8. This short line 24 is connected by a swivel connection 25 to the second end of the endless line 21, which line is suitably guided so that it can be used for raising and lowering of the line release.

Figure 4:
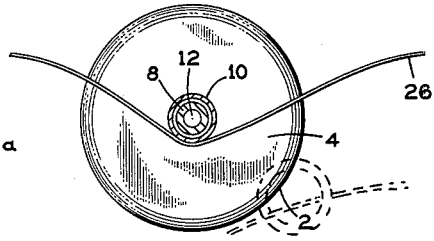
FIG. 4 is a sectional view, taken substantially on the line 4—4 of FIG. 2, looking in the direction of the arrows.
Figure 5:
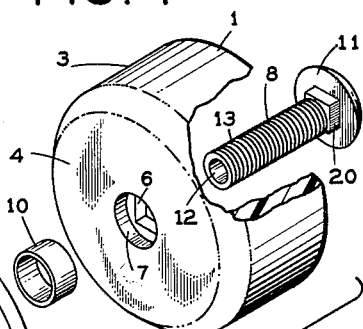
FIG. 5 is an exploded view of the line holder and release device.
Figure 5:
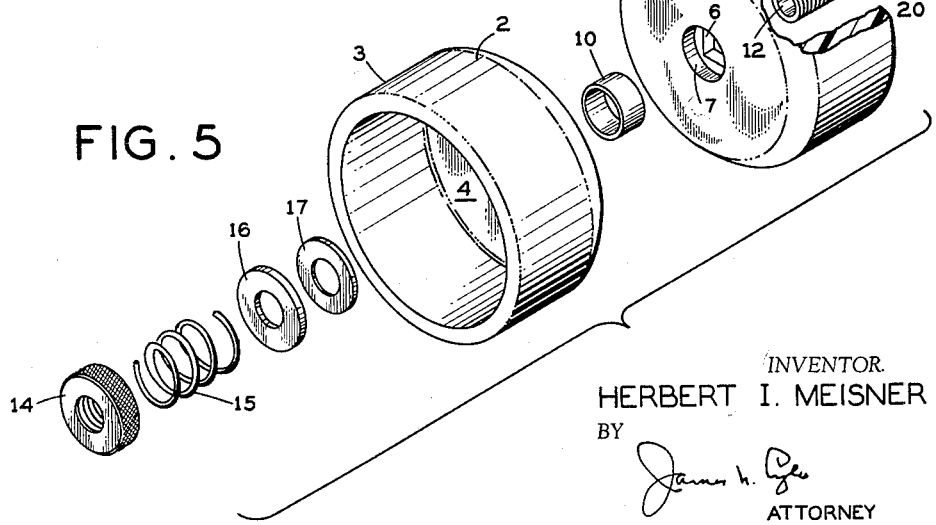

In use, a fishing line 26, leading from the fisherman's reel and extending into the water, for trolling or drifting, is inserted between the abutting end walls 4 of the two cups or shells as far as it will go, or until it reaches the sleeve or bushing 10 substantially as shown in FIG. 4. The sleeve or bushing 10 is effective to prevent the line from contacting with and possibly being damaged by the screw thread 13 provided on the shank of the bolt 8. The clamping pressure imposed by the spring 15 on the two cups or shells 1 and 2 will cause the cups or shells to grip the line between them with a pressure dependent upon the compression of the spring as adjusted by the nut 14.

When a fish strikes or contacts the bait, a pull imparted to the line by such action of the fish, will cause the line to be pulled from between the cups or shells thereby freeing the line and permitting the catch to be played and reeled in. When the line is pulled from between the cups as above described, the spring 15, which maintains the desired pressure between the shells, will bring the shells together with a decided audible snap or noise thus warning the fisherman that his bait has been taken so that he may prepare for the reeling-in operation. The hollow nature of the shells tends to amplify the noise of the contact between the shells when the line is withdrawn from between them.

By means of the nut 14 the adjustment of the spring 15 is regulated to condition the device for any kind of fishing and it will be found to operate perfectly with any type or size of fishing line. It protects the line from damage or fraying and the line cannot become fouled in the outrigger because the device, as suspended in the manner described, is well balanced and will spin out of any line tangle.

In certain instances, it is desirable that a free line is desired and, since in the form of the invention illustrated, the line 26 is clamped between the cups 1 and 2. When a free line is desired, that has no clamping engagement with the device, a ring of plastic or similar material is clamped between the cups 1 and 2 after being engaged with the line so that the line will be free to move and in FIGURE 4, there has been shown in dotted line, a ring through which the line is passed so that normal traverse of the line will be permitted without the normal pressure that would ordinarily be presented when a game fish strikes the line and the line is free to be controlled by the reel of the fisherman. In this particular guide, the movement of the line from the reel to the bait or lure would be much the same as normal fishing and, when a fish strikes the bait, the pull is upon the line, through the ring and, when the fish pulls upon the line, the operator of the reel in a normal manner sets the hook and of course releases the ring outwardly from its clamped position between the cups 1 and 2.

Having thus described a single embodiment of the invention, it is obvious that the same is not to be restricted thereto, but is broad enough to cover all structures coming within the scope of the annexed claim.

What I claim is:

A fishing line holder and release device for use in connection with outrigger fishing poles comprising, a pair of hollow plastic cylindrical shells, each shell having an end wall formed with an inwardly extending central boss, there being a passage extending through each boss and associated end wall, a portion of each of the passages being non-round, and a portion of each of the passages being round, the shells being disposed in end-to-end relationship with their end walls in contact to thereby releasably receive a fishing line between said end walls, the passages through the shells being in axial alignment, a bolt extended through the aligned passages, the bolt having a non-round part fitting in the non-round part of one of the passages, a sleeve fitted in the round part of both of the shell passages and extending about the bolt, a nut adjustable on the bolt, a spring surrounding the bolt and confined between the nut and one of the bosses, and a washer interposed between the spring and the latter boss, the said bolt being axially apertured whereby to receive and be rotatably mounted upon a control line carried by the outrigger pole.

References Cited in the file of this patent

UNITED STATES PATENTS

| | | |
|---|---|---|
| 696,272 | Rodman | Mar. 25, 1902 |
| 902,091 | Lancaster | Oct. 27, 1908 |
| 1,094,577 | Kirkland | Apr. 28, 1914 |
| 1,608,022 | Hanson | Nov. 23, 1926 |
| 2,553,097 | Lampe | May 15, 1951 |
| 2,585,160 | Munn | Feb. 12, 1952 |
| 2,601,736 | Fisher | July 1, 1952 |
| 2,925,682 | Kravitch | Feb. 23, 1960 |
| 2,958,973 | Le May | Nov. 8, 1960 |